Jan. 8, 1974 — J. D. KEEFE ET AL — 3,784,665
METHOD OF FABRICATING AN INTEGRATED PISTON AND CYLINDER MECHANISM AND VALVE ASSEMBLY
Filed Jan. 8, 1971 — 5 Sheets-Sheet 1

INVENTORS
JACK D. KEEFE &
EUGENE W. FINKE
BY Joseph J. Grass
ATTORNEY

United States Patent Office 3,784,665
Patented Jan. 8, 1974

3,784,665
METHOD OF FABRICATING AN INTEGRATED PISTON AND CYLINDER MECHANISM AND VALVE ASSEMBLY
Jack D. Keefe, Dayton, and Eugene W. Finke, Miamisburg, Ohio, assignors to The Monarch Marking System Company, Dayton, Ohio
Filed Jan. 8, 1971, Ser. No. 104,873
Int. Cl. B29d 3/00; B32b 31/06
U.S. Cl. 264—261
9 Claims

ABSTRACT OF THE DISCLOSURE

A method and apparatus for fabricating the housing of an integrated piston and cylinder mechanism and control valve. The housing is formed by placing in a cavity defined by complementary mold sections a cylinder tube, a control valve tube and an inlet tube, with the three tubes properly positioned in the mold cavity and with respect to each other by means of removable mandrels. Openings through the tubes, which serve as fluid passages in the completed assembly, are kept open as a hardenable material is injected into the mold cavity by means of core pins or lugs projecting from the mandrels and extending through the openings in one tube into the the corresponding openings in an adjacent tube.

CROSS-REFERENCE TO RELATED APPLICATION

Hand Held Automatic Labelling Machine and Method of Applying Labels, by Eugene W. Finke, filed on even date herewith.

BACKGROUND OF THE INVENTION

The above noted, related application discloses a hand held labeller which is an improvement on the labeller disclosed in U.S. Pat. No. 3,440,123. The labeller of the application includes many advantageous features of its predecessor but, rather than utilizing manual power to drive the printing and label dispensing mechanism, incorporates a double acting piston and cylinder mechanism controlled by a control valve which is in turn responsive, through appropriate linkage mechanism, to the application of a label to an article to be labelled. Thus, as a printed label is applied to an article a subsequent label is automatically printed and then driven forward to a position opposite the applicator where it may then be applied to another article.

Obviously, since the labeller is intended for use as a hand held piece of equipment it is important that the piston and cylinder mechanism and associated control valve which operate the labeller should be kept as compact and light weight as possible. Preferably, therefore, both the piston and cylinder and associated control mechanism should be integrated in a single housing and conveniently fabricated of a light weight material without the necessity of extensive machining and custom finishing of each such assembly.

Additionally, it will be seen that it is desirable to provide apparatus which will permit the fabrication of an integrated housing for the piston and cylinder and control valve assembly which is relatively uncomplicated and yet provides a housing of the necessary durability and dimensional tolerances required in a compact assembly of this type.

SUMMARY OF THE INVENTION

The present invention provides a method and apparatus for fabricating a combination piston and cylinder mechanism and control valve therefor which is both compact and light weight and, therefore, ideally suited for use in a hand held piece of apparatus such as a hand held labeller. The compactness of the assembly is attained to a large extent through method and apparatus which permits the integration in a single housing of a cylinder, valve tube and an inlet tube associated with the valve tube. With this integrated housing the remaining components making up the assembly may be readily incorporated therein with little or no additional machining and finishing.

To eliminate the necessity of drilling, machining and otherwise finishing the unit making up the integrated housing, a molding technique is utilized which joins a cylinder, a valve tube and an inlet tube in a hardenable material, such as a thermoplastic material. Since the cylinder and tubes are formed before the molding process they are readily machined. Openings may, therefore, be cut through the walls of the tubes to serve as fluid inlets and outlets for the various components of the assembly. Of course, the tubes used in the housing are selected to be of the desired dimensions to accommodate the remaining assembly components to avoid, as noted above, the necessity of machining each assembly during manufacture thereof.

To permit fabrication by the above noted process the present invention also provides a unique system of mold sections and mandrels which allow the cylinder and tubes to be positioned correctly with respect to each other and with the interrelated openings in the walls of the tubes properly aligned and interconnected. As a result, in the subsequent molding process the cylinder and tubes are united in an integrated housing with interconnecting ports formed in the moldable material and extending between corresponding openings in the cylinder and tubular members.

DESCRIPTION OF THE PREFERRED EMBODIMENT

With reference initially to FIGS. 1-6 of the drawings, it will be seen that an integrated piston and cylinder mechanism and control valve 10 includes a housing 11 having a first tubular member 12 defining a cylinder having a pair of spaced, axially aligned openings 14 formed through the wall thereof, a second tubular member 16 defining a valve tube having openings 18 formed through its wall at points corresponding to the openings 14 in the cylinder 12, and a third tubular member 20 defining an inlet tube having enlarged end portions 22 and 24. An opening 26 is formed in the enlarged portion 22 of the inlet tube communicating with a corresponding opening 28 formed in the wall of the valve tube 16 intermediate the openings 18 and circumferentially displaced with respect thereto.

Figures 2, 3, 4:
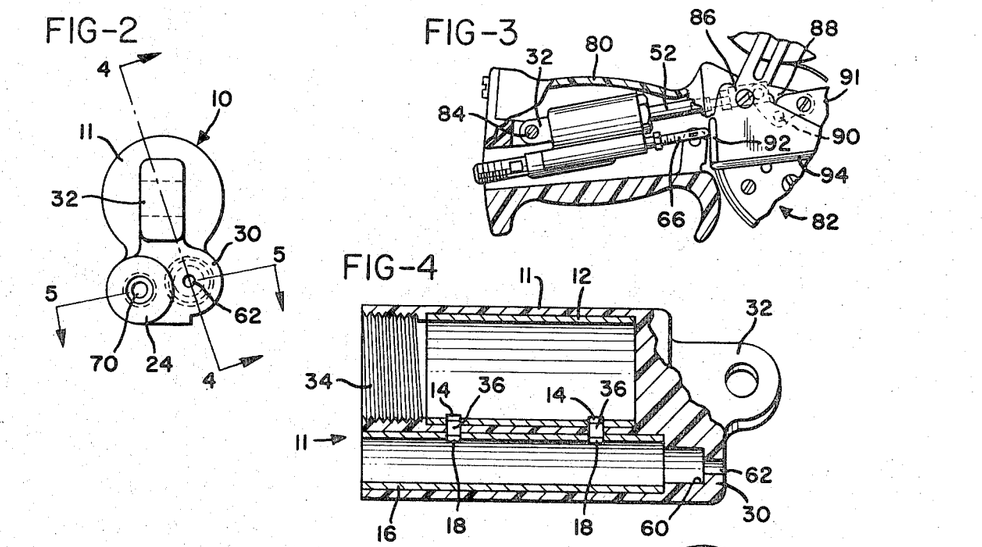
FIG. 2 is an end view of the assembly of FIG. 1.
FIG. 3 is a view, partly in section, showing the assembly of FIG. 1 installed in a typical installation.
FIG. 4 is a sectional view taken on line 4—4 of FIG. 2.

The three tubular members 12, 16 and 20 are held together by a flowable, hardenable material 30 of, for example, the thermoplastic type, such as any of the conventional synthetic resinous materials. The housing 11, as best seen in FIG. 4, is also preferably provided with an apertured lug 32 adjacent one end thereof and a threaded opening 34 adjacent its opposite end concentric with the cylinder 12. It will also be noted, particularly with reference to FIGS. 4-6, that portions of the material 30 are interposed between the tubular members 12 and 16 and that interconnecting ports 36 extend between each set of openings 14-18, while the enlarged end portion 22 of the tubular member 20 is disposed directly in contact with the tubular member 16 in the area of the opening 28 and fixed with respect thereto by means of the material 30.

Figure 1:
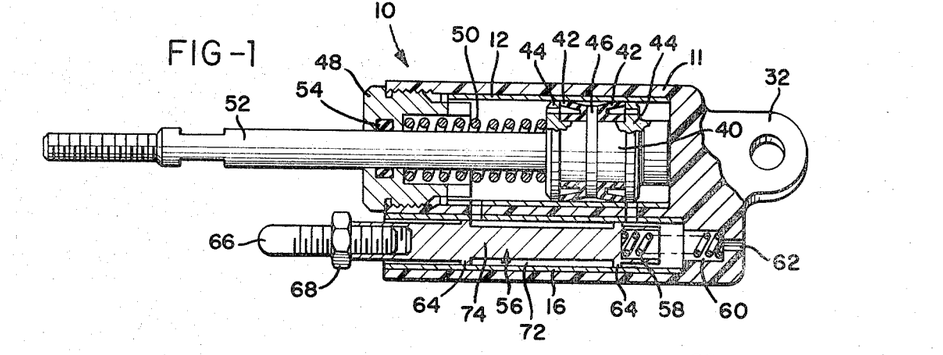
FIG. 1 is a view, partially in section, showing a combination piston and cylinder mechanism and control valve assembly according to the present invention.

As seen in FIG. 1 of the drawings, the cylinder 12 receives a piston 40 carrying a pair of cup-type pressure seals 42 between upstanding apertured end flanges 44 and a centrally located flange 46. An end cap 48 is threadably received in the screw threaded opening 34 of the housing and retains within the cylinder a spring 50 which urges the piston 40 to the right as seen in FIG. 1 of the drawings. A piston rod 52 is attached to the piston 40 and extends outwardly through a central opening formed in the end cap 48 with an O-ring type seal 54 seated in a groove in the end cap and engaging the exterior surface of the piston rod 52.

The valve tube 16 slidably receives a spool valve 56 therein which is urged towards the left as seen in FIG. 1 by means of a spring 58 seated in one end of the spool valve 56 and in a pocket 60 in the housing 10. At the base of the pocket 60 a vent opening 62 is defined extending through the material. The spool valve 56, it will also be seen, is provided with enlarged end portions 64 and a push rod 66 threaded in one end of the spool valve and locked in position by means of the lock nut 68.

Figure 5:
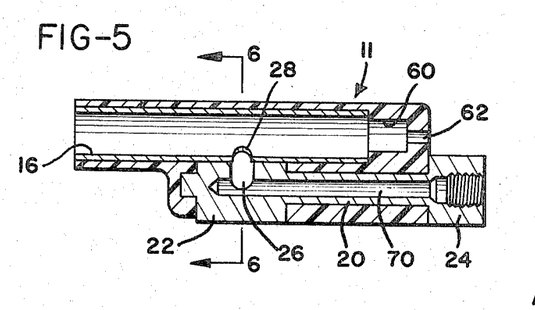
FIG. 5 is a sectional view taken on line 5—5 of FIG. 2.

With reference to FIGS. 1 and 5, it will be seen that fluid pressure admitted into the interior 70 of the inlet tube 20 will flow through the feed passage 26 therein, thence through the feed aperture 28 in the valve tube 16, and into the opening 72 defined by the reduced central portion 74 of the spool valve and the opposed portions of the interior of the valve tube 16. If the spool valve is in the position shown in FIG. 1 of the drawings, the fluid admitted to the space 72 will flow through the left hand outlet 18, interconnecting port 36 and inlet 14, driving the piston to the right to the position shown in FIG. 1 of the drawings. Air trapped to the right of the piston will be forced to exhaust out of the right hand port 36 and vent through opening 62 to atmosphere.

On the other hand, if a force is applied to the push rod 66, sliding the spool 56 to the right as seen in FIG. 1 and overcoming the force of the spring 58, pressurized fluid from the cavity 72 will be directed through the right hand outlet 18, interconnecting port 36 and inlet 14, driving the piston 40 to the left as seen in FIG. 1 in opposition to the pressure exerted by the spring 50. Of course, fluid which would tend to become trapped in the cylinder 12 as the piston moves to the left is readily vented through the left hand inlet 14, port 36 and outlet 18 and around the spool valve 74 to atmosphere.

The assembly of FIG. 1 is shown in FIG. 3 in a typical installation, the hand held labeller of the above noted, related application being selected for purposes of illustration. Thus, the lug 32 is pivotally attached within the hollow handle 80 of the labeller 82 by means of a pin 84 and the end of the piston rod 52 attached to a mounting block 86 pivotally between the bifurcated legs of a clevis 88, which in turn is connected, as at 90, to the supporting frame 91 of the labeller printing head. The end of the push rod 66 engages an upstanding portion 92 of a linkage mechanism 94 which is controlled by contact of an applicator of the labeller with an article being labelled.

Shifting of the linkage 94 to the left as seen in FIG. 3 will cause the push rod 66 to be moved in the same direction by the upstanding portion 92. This in turn will shift the spool valve from the position shown in FIG. 1 of the drawings to a position in which fluid is admitted to the right side of the piston 40, driving the piston rod to the left as seen in FIG. 1 or to the right as seen in FIG. 3. Movement of the piston rod 52 to the right as seen in FIG. 3 will cause the printing head supporting frame to pivot, operating the hand held labeller in a manner described in detail in the above noted related application.

Figure 7:
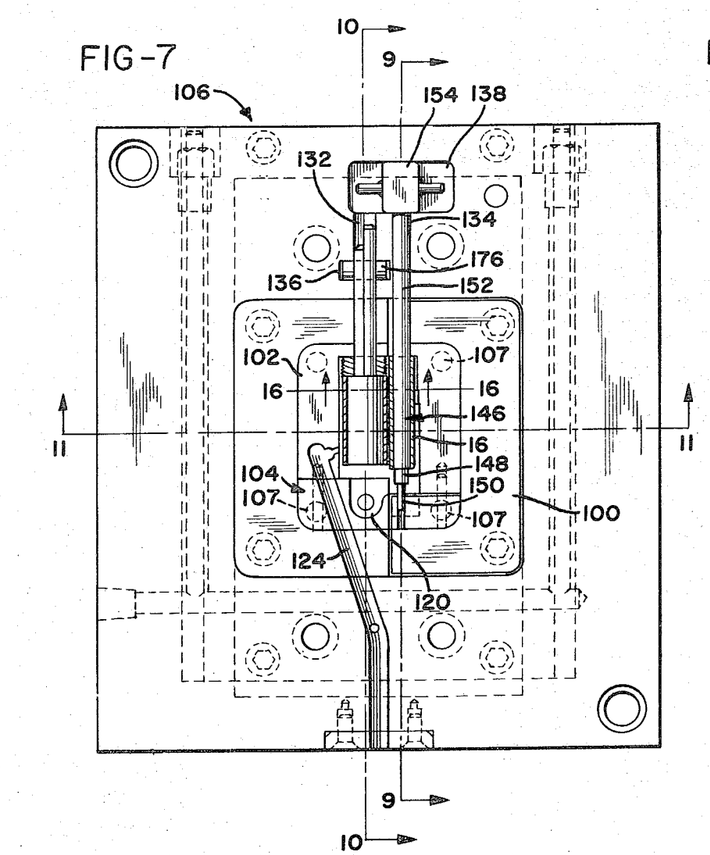
FIG. 7 is top plan view of a bottom mold section and associated mandrels utilized in fabricating the cylinder and valve housing.
Figures 12, 13, 14, 15, 16:
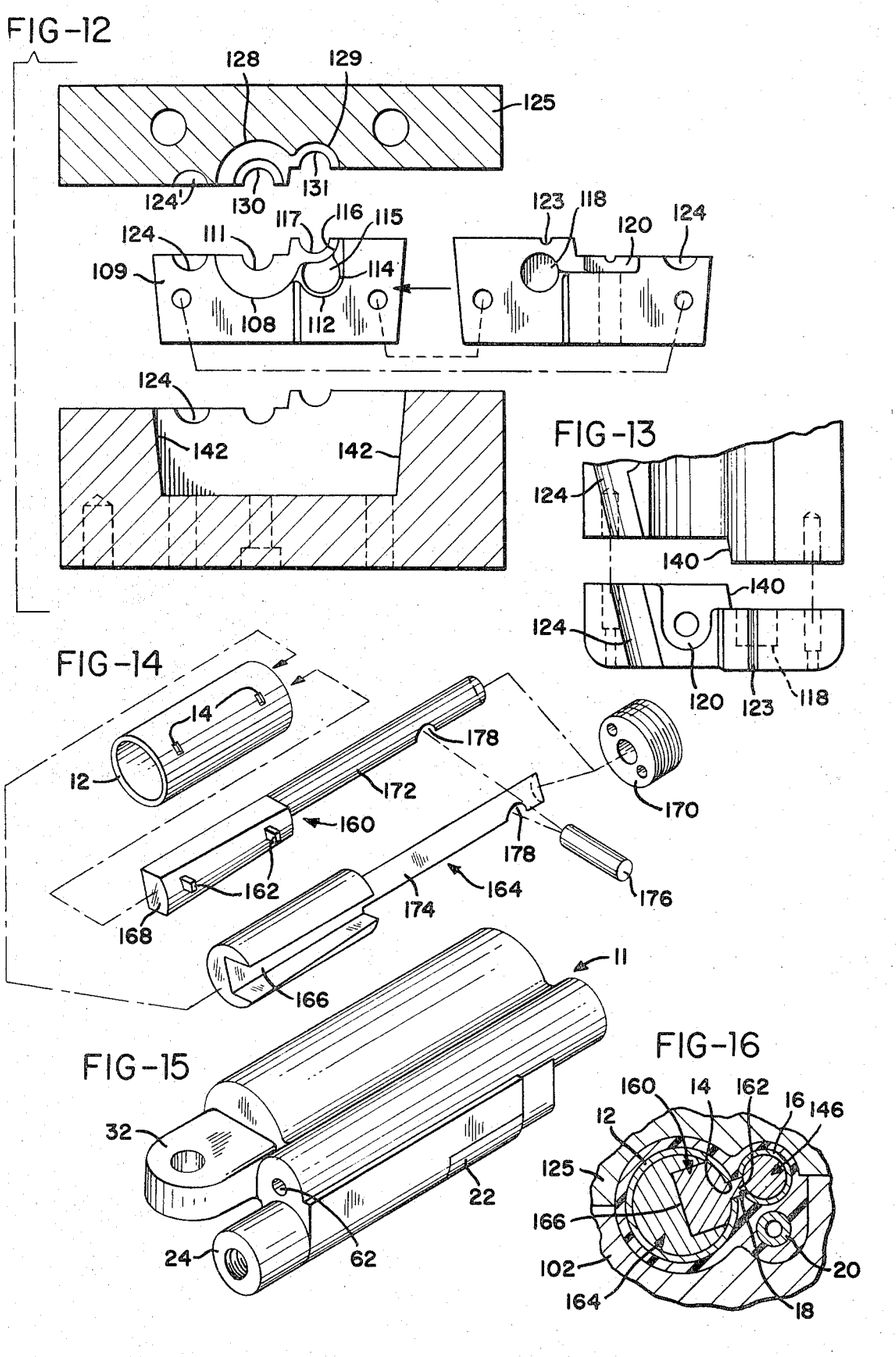
FIG. 12 is an exploded view, partly in section, showing the various sections of the mold.
FIG. 13 is an exploded view of a portion of the bottom mold section and another portion complementary thereto.
FIG. 14 is an exploded view of a cylinder, mandrel, locating pin and thread forming collar.
FIG. 15 is a perspective view of the integrated housing of the present invention.
FIG. 16 is a cross-sectional view taken on line 16—16 of FIG. 7.

As noted above, the present invention also includes apparatus for fabricating the integrated housing shown, for example, in FIG. 15 of the drawings. Thus, as seen in FIG. 7 of the drawings, such apparatus may include a base member 100 seating first and second complementary mold sections 102 and 104 with the base member 100 supported by suitable structure, referenced in its entirety by the numeral 106 and including ejector pins 107.

Figure 17:
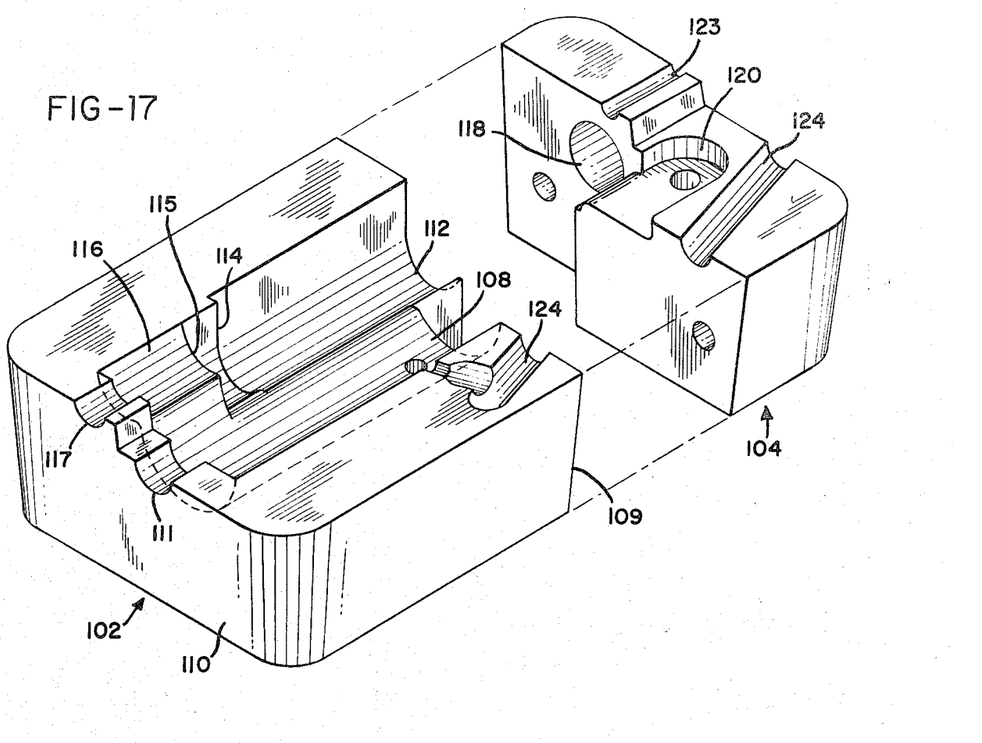
FIG. 17 is an enlarged exploded perspective view showing the mold portions of FIG. 13.

Mold section 102, as best seen in FIGS. 12 and 17, has a substantially circular groove 108 positioned along one side thereof and extending from one end 109 of the section 102 to a point just short of its opposite end 110. Adjacent its end 110 mold section 102 is provided with a second circularly shaped groove 111 of appreciably smaller cross-section than the cross-section of the trough 108. Extending in parallel relationship to groove 108 is a second groove 112, which is also of appreciably smaller cross-section than the groove 108, and which is stepped, as at 114, and terminates at a point 115.

Figure 9:
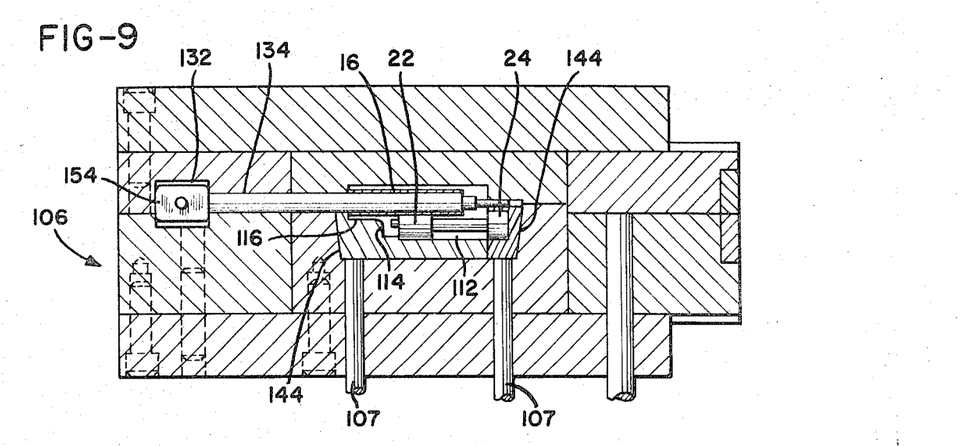
FIG. 9 is a sectional view taken on line 9—9 of FIG. 7.
Figure 10:
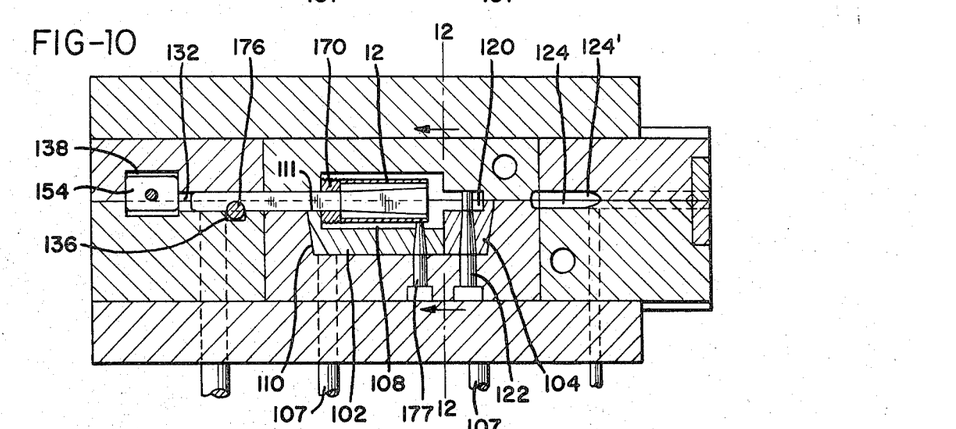
FIG. 10 is a sectional view taken on line 10—10 of FIG. 7.

Adjacent the point 115 the mold section 102 is provided with another groove 116 which, as seen in FIGS. 12 and 17, is smaller in cross-section than the groove 112 and which, as seen in FIG. 9, is of appreciably shorter length than either of the grooves 108 or 112. Additionally, a fairly short, small radius groove 117 is positioned concentrically with respect to groove 116 at end 110 of section 102. The second mold section 104 is complementary to the mold section 102 and carries a tubular socket 118 in alignment with the end of the trough 112. Section 104 also includes a lug defining portion 120 through which a pin 122 projects, as best seen in FIG. 10 of the drawings, and a small diameter groove 123. It will also be noted that both sections combined form half of an injection port 124.

Figure 8:
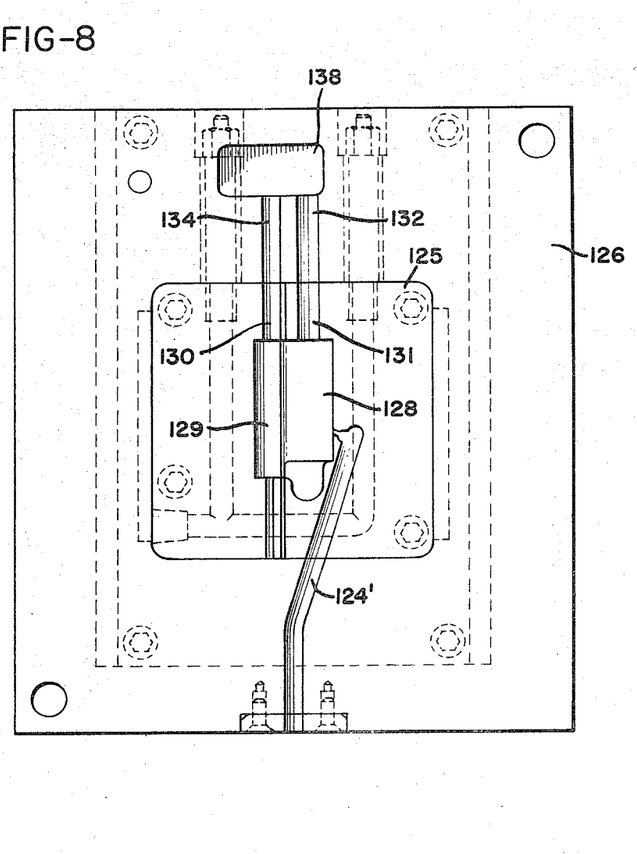
FIG. 8 is a bottom plan view of the top mold section utilized in the fabrication process of the present invention.
Figure 11:
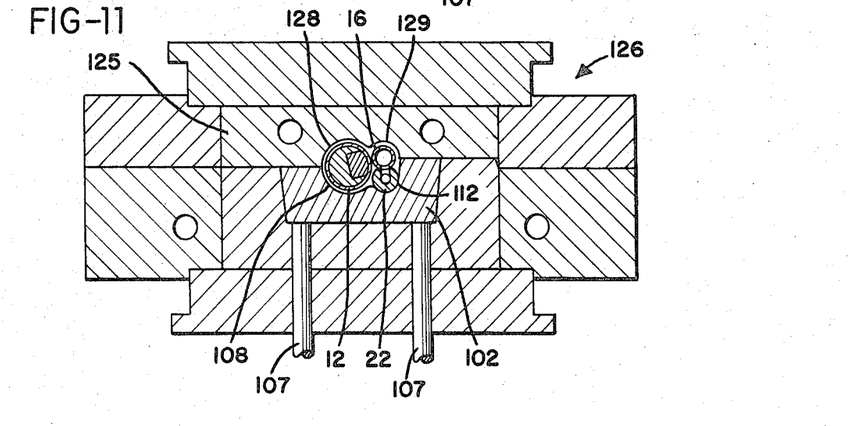
FIG. 11 is a sectional view taken on line 11—11 of FIG. 7.

A third mold section 125, as seen in FIGS. 8 and 12, is received in a supporting structure 126 and is provided with circular grooves 128 and 129 which mate with grooves 108 and 116. It will also be noted from FIGS. 7-10 and 12 of the drawings that when the mold sections and their supporting structures are assembled as shown in FIGS. 9-11 a pair of tubular passageways 132 and 134 are defined aligned with the composite passages 111-130 and 117-131, respectively. A slot 136 (see FIGS. 7 and 10 of the drawings) traverses passageway 132 and both passages terminate in a pocket 138.

In utilizing the apparatus just described section 104 is assembled to section 102 by slipping the socket 118 over the end 24 of the inlet tube and the two sections 102 and 104 positioned within the base member 100. The enlarged end 22 of tube 20 then rests in groove 112. To facilitate the assembly of sections 102 and 104 and their insertion in the base member 100 it will be noted that the former are provided with sloped abutting surfaces 140 while the side walls 142 and end walls 144 of the base member 100 are sloped inwardly complementarily to opposing walls of the sections 102 and 104.

Next the valve tube 16 is provided with an internally positioned mandrel 146 which is inserted in the valve tube with stepped reduced portions 148 and 150 projecting outwardly thereof. Projecting outwardly of the opposite end of the tube 16 is a stem 152 terminating in a handle 154 and the assembled mandrel and valve tube are positioned by placing the stem 152 in the groove 111 and passageways 134 with the handle 154 in the opening 138 and with the step portion 150 lying in the groove 123.

As seen in FIG. 14, a first section 160 of a sectional mandrel having outwardly projecting lugs 162 is positioned in the cylinder 12 with the lugs 162 projecting outwardly through the inlets 14. Next, a second section 164 of the sectional mandrel is slipped into place in the cylinder 12 with the slot 166 of the section 164 receiving the complementarily shaped portion 168 of the section 160. A threaded collar 170 is then slipped over the circular stem formed by the complementary stem sections 172 and 174 of the mandrel sections 160 and 164, respectively.

All three tubes are closed, during the molding step by mandrels or otherwise, preventing entrance of the hardenable material into the tubes.

A pin 176 is secured in the cross slot 136, as seen in FIGS. 7 and 10, and the assembled cylinder 12 and sectional mandrel with the collar 170 attached are positioned n the mold section 102 with the stem 172–174 received in grooves 111 and 130 and the end of cylinder 12 resting on pin 177. The pin 177 and complementary notches 178 in the stem sections 172 and 174 serve to position the cylinder 12 with its inlet openings 14 in a desired orientation. The valve tube 16 is then rotated about its mandrel 146 until the lugs 162 on the section 160 are received in its outlet openings 18, as best seen in FIG. 16 of the drawings.

Figure 6:
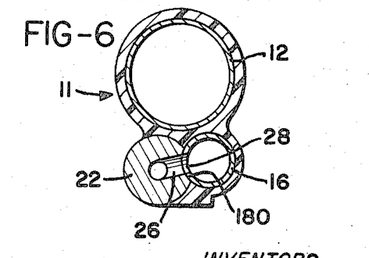
FIG. 6 is a sectional view taken on line 6—6 of FIG. 5.

Since enlarged portion 22 of the inlet tube 20 which has a closed end is provided with an arcuately shaped section 180, as seen in FIG. 6, to provide intimate contact between it and the opposed section of the valve tube 16, positioning of the lugs 162 in the openings 18 of the valve tube 16 and positioning of the arcuate section 180 against the tube 16 correctly positions the cylinder and tubes in a direction about their respective axes. This, in conjunction with the various stop members described above which position the tubes with respect to each other in an axial position, insures automatic alignment of corresponding openings in the cylinder and tubes.

Mold section 125 and its supporting structure 126 are then brought into position with the mold section 102 and 104, the base member 100 and the support structure 106 and secured together in any suitable manner to collectively define a mold cavity fed by the injection port formed by grooves 124 and the complementary grooves 124' in sections 125 and 126.

A flowable, hardenable material, preferably of the thermoplastic type such as any of the conventional synthetic resinous materials, is then injected through the injection port into the mold cavity, encapsulating the cylinder 12 and tubes 16 and 20.

Although a portion of the material will be interposed between cylinder and tube 16, as seen in FIG. 16 of the drawings, the lugs 162 extending between and interconnecting the openings 14 and 18 prevent these openings from being filled with the material. Also, although a portion of the material will flow between the central portion of the inlet tube 20 and the opposed portion of the valve tube 16 the arcuate section of enlarged portion 22 of the inlet tube 20 is in contact with the valve tube 16 in the area adjacent the feed aperture 28 to prevent this aperture from being closed by the material.

It will also be noted with reference to FIGS. 5 and 7 of the drawings that stepped portions 148 and 150, in the completed structure define the pocket 60 and vent opening 62, respectively. The collar 170, of course, provides the threaded opening 34, while the section 120 of the mold section 104 and the pin 122 define the apertured lug 32. After the material has been allowed to harden mold section 124 and its supporting structure are removed, the mold sections 102 and 104 ejected from their supporting base 100 and the mandrels removed to provide the structure shown in FIG. 15 of the drawings.

This structure, with little or no additional machining, is then in a suitable condition to be assembled with the remaining components shown in FIG. 1 of the drawings to provide a combined piston and cylinder and control valve assembly suitable for installation in structure as shown in FIG. 3 of the drawings or in any other installation in which a compact unit of this type is desired.

While the methods herein described, and the forms of apparatus for carrying these methods into effect, constitute preferred embodiments of the invention, it is to be understood that the invention is not limited to these precise methods and forms of apparatus, and that changes may be made in either without departing from the scope of the invention which is defined in the appended claims.

What is claimed is:

1. A method of fabricating a cylinder and valve housing comprising:
   providing a first tubular member defining a cylinder with a pair of spaced inlet openings formed through the wall thereof,
   providing a second tubular member defining a valve tube with a pair of spaced outlet openings formed through the wall thereof at a spacing corresponding to the spacing of said inlet openings through the wall of said cylinder and a feed aperture intermediate said outlet openings,
   providing a third tubular member defining an inlet tube with an enlarged end portion and a feed passage extending through said enlarged end portion into the interior of said inlet tube,
   positioning said inlet tube in a first mold section with a substantial portion of the exterior surface of said inlet tube spaced from opposed portions of said mold section,
   mounting said valve tube on a mandrel,
   positioning said valve tube and said mandrel in said mold section with said enlarged end portion of said inlet tube contacting said valve tube adjacent said feed aperture with said feed aperture and said feed passage substantially aligned and the exterior surface of said valve tube spaced from opposed portions of said mold section,
   positioning a first section of a longitudinally split sectional mandrel having outwardly projecting withdrawable lugs and a stem portion in said cylinder with said lugs projecting outwardly through said inlet openings and said stem portion projecting from one end of said cylinder, with the lugs extending into the corresponding inlet openings of the valve tube,
   completing said sectional mandrel by inserting a second section thereof into the cylinder to substantially fill the interior of said cylinder,
   mounting on said stem portion of said sectional mandrel an externally threaded collar with said collar positioned in abutting relationship to said one end of said cylinder,
   positioning said cylinder and said sectional mandrel and collar in said first mold section with distal portions of said lugs received in said outlet openings of said valve tube,
   substantially completely enclosing in mold sections including said first mold section and cylinder, and valve and inlet tubes, mandrel and collar with exterior surfaces thereof spaced from opposed interior surfaces of said mold sections to form a substantially continous cavity, substantially completely filling said continuous cavity with a thermoplastic material, while preventing the thermoplastic material from filling the first, second, and third tubular members, allowing said thermoplastic material to harden, and withdrawing said mold sections, mandrel and collar to provide an integrated cyclinder and valve housing.

2. A method of fabricating an integrated cylinder and valve housing comprising:

providing a first mold section having a pair of longitudinally extending partially circular grooves formed therein, positioning an inlet tube having an opening formed through the wall thereof in one of said grooves of said first mold section with an end portion of said inlet tube projecting outwardly of an end of said groove, providing a second mold section complementary to said first mold section and having a tubular socket therein, assembling said first and second mold sections with said end portion of said inlet tube received in said socket, mounting a valve tube having openings formed through the wall thereof in a mandrel and positioning said assembled valve tube and mandrel in said assembled first and second mold sections in overlying relationship to said inlet tube and with corresponding openings in said tubes aligned, mounting a cylinder having openings formed through a wall thereof on a withdrawable mandrel having outwardly projecting lugs thereon with said lugs projecting through said cylinder wall openings, positioning said cylinder and mandrel in said assembled first and second mold sections with said lugs projecting into corresponding openings formed in said valve tube, assembling a third mold section with said assembled first and second mold sections to substantially enclose said cylinder and tubes and define with the exterior surfaces thereof a continuous cavity, filling said cavity with a flowable hardenable material while preventing the hardenable material from filling the inlet outlet valve tubes, allowing said material to harden, and withdrawing said mold sections and mandrel to provide an integrated housing.

3. A method of fabricating an integrated assembly, comprising the steps of:

providing a first tubular member having two first transverse openings through its side wall and a second tubular member having two second transverse openings through its side walls;

mounting the first and second tubular members in fixed parallel relationship with respect to each other in a mold with the first and second transverse openings spaced apart and transversely aligned;

positioning withdrawable lug means to extend through the first transverse openings and into the second transverse openings;

thereafter injecting hardenable material into the mold about the first and second tubular members and the lug means while preventing the hardenable material from filling the first and second tubular members; and thereafter withdrawing the lug means when the material has at least substantially hardened to provide transverse interconnecting passages in the hardenable material between the first and second transverse openings in the side walls of the tubular members.

4. A method of fabricating an integrated assembly, comprising the steps of:

providing a first tubular member having at least one transverse inlet opening through its side wall and a second tubular member having at least one transverse outlet opening through its side wall;

mounting the first and second tubular members in fixed relationship, but in other than axial alignment, with respect to each other in a mold with the transverse openings spaced apart and transversely aligned;

positioning withdrawable lug means to extend through one transverse opening and into the other transverse opening;

thereafter injecting hardenable material about the first and second tubular members and lug means while preventing the hardenable material from filling the first and second tubular members; and thereafter withdrawable the lug means when the material has at least substantially hardened to provide a transverse interconnecting passage in the hardenable material between the transverse inlet and outlet openings in the side walls of the tubular members.

5. The method of claim 4, wherein the mounting step further comprises:

positioning the first and second tubular members in parallel relationship.

6. A method of fabricating an integral assembly, comprising the steps of:

providing first and second tubular members each having at least one transverse opening through its side wall;

mounting the first tubular member on a withdrawable mandrel having transversely outwardly projecting lug means;

positioning the mandrel with its first tubular member and the second tubular member in a mold in spaced apart parallel relationship with respect to each other with the lug means projecting outwardly through the transverse opening in the side wall of the first tubular member and into the transverse opening in the side wall of the second tubular member;

injecting hardenable material about the tubular members and the lug means while preventing the hardenable material from filling the first and second tubular members; and withdrawing the mandrel and its lug means to provide a pair of tubular members fixed with respect to each other by the hardenable material and having the first and second transverse openings interconnected by a transverse passage in the hardenable material.

7. The method as defined in claim 6, wherein the mandrel is formed with complementary sections, the mounting step further comprising:

inserting one of the complementary sections bearing the lug means into the first tubular member with the lug means extending through and projecting transversely outwardly from the transverse side opening in the first tubular member; and thereafter inserting another mandrel section into the first tubular member to maintain the one mandrel section and its lug means in position.

8. The method as defined in claim 6 further comprising the steps of:

mounting a threaded die adjacent one end of one of the tubular members in substantial concentricity thereto prior to injection of the hardenable material; and removing the threaded die after the hardenable material has at least substantially hardened to provide a threaded opening at one end of one of the tubular members.

9. A method of fabricating an integrated assembly, comprising the steps of:

providing first and second tubular members each having at least one transverse opening through its side walls;

mounting the first withdrawable tubular member on a first mandrel having transversely outwardly projecting lug means;

mounting the second withdrawable tubular member on a second mandrel;

positioning the mandrels with their respective first and second tubular members in a mold in spaced apart parallel relationship with respect to each other with the lug means projecting outwardly through the transverse opening in the side wall of the first tubular member and into the transverse opening in the side wall of the second tubular member;

injecting hardenable material into the mold about the tubular members and the lug means while preventing the hardenable material from filling the first and second tubular members; and withdrawing the first mandrel and its lug means and the second mandrel to provide a pair of tubular members fixed with respect to each other by the hardenable material and having the first and second transverse openings interconnected by a transverse passage in the hardenable material.

References Cited
UNITED STATES PATENTS

| | | | |
|---|---|---|---|
| 2,119,056 | 5/1938 | Peterson | 249—96 X R |
| 3,581,364 | 6/1971 | Wyse | 264—261 |
| 3,608,046 | 9/1971 | Phillips et al. | 264—DIG. 44 |
| 2,429,146 | 10/1947 | Wessel | 249—145 X |
| 3,021,241 | 2/1962 | Schneiderman et al. | 264—317 |

ROBERT F. WHITE, Primary Examiner

W. E. HOAG, Assistant Examiner

U.S. Cl. X.R.

264—263, 318

UNITED STATES PATENT OFFICE
CERTIFICATE OF CORRECTION

Patent No. 3,784,665                    Dated January 8, 1974

Inventor(s) Jack D. Keefe and Eugene W. Finke

It is certified that error appears in the above-identified patent and that said Letters Patent are hereby corrected as shown below:

Patent Office Errors

Column 1, line 6, "The Monarch Marking System Company" should be -- Monarch Marking Systems, Inc.--. Column 1, line 25, "the" (second occurrence) has been repeated. Column 5, line 34, "in" (first occurrence) is misspelled. Column 7, line 48, after "inlet" --and-- has been omitted. Column 7, line 57, "walls" should be --wall--. Column 8, line 18, "withdrawable" should be --withdrawing--.

Applicant's Errors

Column 9, line 3, cancel "withdrawable". Column 9, line 4, after "first" insert --withdrawable--. Column 9, line 6, cancel "withdrawable". Column 9, line 7, after "second" insert --withdrawable--.

Signed and sealed this 17th day of September 1974.

(SEAL)
Attest:

McCOY M. GIBSON, JR.
Attesting Officer

C. MARSHALL DANN
Commissioner of Patents